United States Patent
Mittelsteadt et al.

(10) Patent No.: US 7,584,033 B2
(45) Date of Patent: Sep. 1, 2009

(54) AUTOMOBILE MONITORING FOR OPERATION ANALYSIS

(75) Inventors: Lisa Mittelsteadt, Apple Valley, MN (US); John Mittelsteadt, Apple Valley, MN (US); Robert J. Crawford, Apple Valley, MN (US)

(73) Assignee: Strategic Design Federation W. Inc., Tortola (VG)

( * ) Notice: Subject to any disclaimer, the term of this patent is extended or adjusted under 35 U.S.C. 154(b) by 653 days.

(21) Appl. No.: 11/024,044

(22) Filed: Dec. 28, 2004

(65) Prior Publication Data

US 2005/0171663 A1 Aug. 4, 2005

Related U.S. Application Data

(63) Continuation-in-part of application No. 10/412,498, filed on Apr. 11, 2003, now Pat. No. 6,865,457, which is a continuation-in-part of application No. 09/654,026, filed on Aug. 31, 2000, now Pat. No. 6,556,905.

(51) Int. Cl.
  *B08B 1/08* (2006.01)
  *G06F 19/00* (2006.01)
(52) U.S. Cl. .............................. 701/35; 701/29; 701/33; 705/4; 340/870.05
(58) Field of Classification Search .................... 701/33, 701/35, 29, 93; 340/539.13, 438, 439, 936, 340/988; 705/4
  See application file for complete search history.

(56) References Cited

U.S. PATENT DOCUMENTS 3,781,824 A 12/1973 Caiati et al.
3,870,894 A 3/1975 Brede et al.
4,241,403 A 12/1980 Schultz (Continued)

FOREIGN PATENT DOCUMENTS

WO WO 84/03359 8/1984

(Continued)

OTHER PUBLICATIONS

Haglund, Rick, "More Than a Set of Wheels"; *Star Tribune*; Minneapolis, MN, Oct. 23, 2000.

(Continued)

*Primary Examiner*—Tan Q Nguyen
(74) *Attorney, Agent, or Firm*—Carlineo, Spicer & Kee, LLC (57) ABSTRACT

An automobile monitoring arrangement tracks and records automobile operation for post-use automobile operation analysis and in a manner with default-operation modes that facilitate use by automobile owners/supervisors and by those supervised by the automobile owners/supervisors. In one specific embodiment, a record of automobile-operation data contains periodic recordings of speed and direction of an automobile while it was being driven, as such data is provided by a conventional electronic compass and the automobile's electronic speed indicating signal. A processor performs calculations using speed and directional data to calculate acceleration and rate of directional change. Automobile operation data from the recording devices and the calculations performed is compared to stored reference data to determine if the vehicle was abused or driven in an unsafe manner by the operator. The data is output to a display showing automobile operating data and instances where the automobile was abused or driven in an unsafe manner.

18 Claims, 5 Drawing Sheets

U.S. PATENT DOCUMENTS

| | | | |
|---|---|---|---|
| 4,258,421 A | 3/1981 | Juhasz et al. | |
| 4,387,587 A | 6/1983 | Faulconer | |
| 4,533,962 A | 8/1985 | Decker et al. | |
| 4,591,823 A | 5/1986 | Horvat | |
| 4,638,289 A | 1/1987 | Zottnik | |
| 4,644,368 A | 2/1987 | Mutz | |
| 4,688,244 A | 8/1987 | Hannon et al. | |
| 4,750,197 A | 6/1988 | Denekamp et al. | |
| 4,836,024 A | 6/1989 | Woehrl et al. | |
| 4,843,578 A * | 6/1989 | Wade | 702/142 |
| 4,944,401 A | 7/1990 | Groenewegen | |
| 4,992,943 A | 2/1991 | McCracken | |
| 5,129,605 A | 7/1992 | Burns et al. | |
| 5,303,163 A | 4/1994 | Ebaugh et al. | |
| 5,305,214 A | 4/1994 | Komatsu | |
| 5,412,570 A | 5/1995 | Gruler et al. | |
| 5,446,659 A | 8/1995 | Yamawaki | |
| 5,471,193 A | 11/1995 | Peterson et al. | |
| 5,475,597 A | 12/1995 | Buck | |
| 5,570,087 A * | 10/1996 | Lemelson | 340/870.05 |
| 5,581,464 A | 12/1996 | Woll et al. | |
| 5,608,629 A | 3/1997 | Cuddihy et al. | |
| 5,719,771 A | 2/1998 | Buck et al. | |
| 5,790,427 A | 8/1998 | Greer et al. | |
| 5,815,093 A | 9/1998 | Kikinis | |
| 5,844,505 A | 12/1998 | Van Ryzin | |
| 5,862,500 A * | 1/1999 | Goodwin | 701/35 |
| 5,877,707 A | 3/1999 | Kowalick | |
| 5,952,941 A | 9/1999 | Mardirossian | |
| 5,982,168 A | 11/1999 | Westberg et al. | |
| 6,008,740 A | 12/1999 | Hopkins | |
| 6,014,602 A | 1/2000 | Kithil et al. | |
| 6,037,862 A | 3/2000 | Ying | |
| 6,067,488 A | 5/2000 | Tano | |
| 6,076,026 A | 6/2000 | Jambhekar et al. | |
| 6,087,965 A * | 7/2000 | Murphy | 340/991 |
| 6,141,610 A * | 10/2000 | Rothert et al. | 701/35 |
| 6,141,611 A | 10/2000 | Mackey et al. | |
| 6,163,277 A | 12/2000 | Geholt | |
| 6,185,490 B1 | 2/2001 | Ferguson | |
| 6,240,773 B1 | 6/2001 | Rita et al. | |
| 6,246,933 B1 | 6/2001 | Bague | |
| 6,246,934 B1 | 6/2001 | Otake et al. | |
| 6,253,129 B1 | 6/2001 | Jenkins et al. | |
| 6,265,989 B1 | 7/2001 | Taylor | |
| 6,298,290 B1 | 10/2001 | Abe et al. | |
| 6,301,533 B1 * | 10/2001 | Markow | 701/35 |
| 6,317,668 B1 * | 11/2001 | Thibault | 701/35 |
| 6,473,000 B1 | 10/2002 | Secreet et al. | |
| 6,728,605 B2 | 4/2004 | Lash et al. | |
| 6,748,322 B1 | 6/2004 | Fernandez | |

FOREIGN PATENT DOCUMENTS

| | | |
|---|---|---|
| WO | WO 88/09023 | 11/1988 |
| WO | WO 93/10510 | 5/1993 |
| WO | WO 94/04975 | 3/1994 |
| WO | WO 94/18645 | 8/1994 |
| WO | WO 98/47109 | 10/1998 |
| WO | WO 00/17721 A2 | 3/2000 |
| WO | WO 00/17721 A3 | 3/2000 |
| WO | WO 01/18491 | 3/2001 |

OTHER PUBLICATIONS

Lewis, Raphael, "Parents of Teenage Drivers Use Monitoring to Reduce Worries"; startribune.com; Minneapolis, MN, Aug. 19, 2000.

Serres, Chris, "Big Brother under the dashboard?"; *Star Tribune*; Minneapolis, MN, Aug. 10, 2004.

\* cited by examiner

AUTOMOBILE MONITORING FOR OPERATION ANALYSIS

RELATED PATENT DOCUMENTS

This is a continuation-in-part of U.S. patent application Ser. No. 10/412,498, filed on Apr. 11, 2003 (MITT.001CIP) now U.S. Pat. No. 6,865,457, which is a continuation-in-part of U.S. patent application Ser. No. 09/654,026, filed on Aug. 31, 2000 (MITT.001PA) now U.S. Pat. No. 6,556,905, and bearing the same title; priority to each of the above patent documents is claimed under 35 U.S.C. § 120 for common subject matter, and which is fully incorporated herein by reference.

FIELD OF THE INVENTION

The present invention relates to data recording systems and, more particularly, to a vehicle monitoring arrangement and methodology therefor.

BACKGROUND

The widespread use of motor vehicles for both personal and work related activity places millions of vehicles on roads each day with their operation being largely unmonitored. Unmonitored vehicle operation can lead to a variety of issues and problems including, for example, abusive use of the vehicle and related driving-safety issues.

One specific example application is the use of a parent's vehicle by a teenage child. Teenagers hold jobs after school, attend college classes during the high school day, take themselves to after-school events, and assist the family with errands. Oftentimes the only practicable transportation available to and from these tasks is driving their parent's automobile, as many parents of young adults are unavailable and cannot drive the teen themselves. When young adults drive irresponsibly, they place themselves and others at risk. In addition to safety concerns, the high accident rates associated with inexperienced drivers causes higher insurance rates as a whole for the parents of teenage drivers.

Another problem is the inability of an employer at companies that use a fleet of vehicles (e.g., at a bus company or a trucking operation) to monitor the manner in which employees are operating their assigned vehicles. An employer attempts to prevent misuse or abuse of vehicles in order to keep the vehicles in good condition, thereby reducing maintenance costs and equipment down time. Additionally, when an operator is abusing a vehicle they are also likely to be driving dangerously. Reducing dangerous driving reduces the number of accidents and all of the costs associated with accidents. Currently, the only information available to employers comes from an individual's official driving record, personal observations or tips from other drivers on the road. It is therefore difficult for an employer to effectively monitor misuse of a vehicle by their employees.

Rented or leased vehicles receive an inordinate amount of intentional abuse from drivers. Rental agencies currently have no way of knowing which drivers abuse their vehicles. Therefore, the costs associated with vehicles that have been treated harshly are necessarily dispersed to all consumers. In the same manner, a car dealer and their customers face uncertainty in pricing an automobile coming off a lease, because neither party knows if a lessee abused a particular vehicle.

Another problem exists in the monitoring of those individuals on probation for violations resulting from the misuse of a vehicle. Violations such as repeated speeding violations or driving while under the influence of drugs or alcohol may cause a person to be issued a restricted license. Courts may issue these individuals an occupational license limiting when they may drive. Currently, these limitations cannot be closely enforced and cannot address the manner in which the violator operates the vehicle.

In an attempt to curb these issues and abuses, certain employers are increasingly using "1-800- . . . 'How's my driving?'" bumper stickers on their vehicles in hope that other drivers will voluntarily call the employer and report vehicle misuse. While this appears to be somewhat effective for larger companies able to set up a toll-free telephone number, this practice has limitations including reliance on volunteer callers and a willingness to publicly display the telephone number on the bumper sticker.

The widespread use of the Internet has lead to a computer-based approach for addressing these issues. At least one company has set up a business in which a parents pay an annual fee for "1-800- . . . 'How's my driving?'" bumper stickers wherein the toll-free 800 number is shared by all subscribers and the company provides feedback to the parents in response to driving-complaint calls. More recent approaches have included use of cameras in consumer and police cars for image-recording environments in which the automobiles are traveling. These approaches, however, have various drawbacks, and some insurance company and safe-driving advocates remain unconvinced that these call-in monitoring programs are effective in reducing incidents of unsafe driving.

In certain driver-monitoring approaches, recordation of certain driving conditions occurs to determine the conditions of the vehicle(s) at the time of an accident or traffic violation. This type of approach can be very desirable from the perspective of insurance companies and government enforcement and regulatory agencies since the recorded information can be used to determine liability and fault at the time of the accident or traffic violation. For many car owners, however, this type of approach can be used against their interest because this recorded information can be used to determine liability and fault of the car owner. While discarding the recorded information would seem to be a common sense solution to this concern, once the accident or violation occurs, certain laws might interpret the destruction of such information to unlawful.

There continues to be need for improving monitoring techniques in ways that overcome the above-mentioned deficiencies and that can make roadways safer, lessen abuses on vehicles and accurately record vehicle operation during certain intervals or occurrences.

SUMMARY OF THE INVENTION

The present invention is directed to a method for monitoring the use of a vehicle by selectively recording certain vehicle-operating data during vehicle operation. The present invention is exemplified in a number of implementations and applications, some of which are summarized below.

According to one example embodiment, the present invention addresses the need for a supervisory automobile operator (or automobile owner) to monitor another driver of the automobile while recognizing that the supervisory automobile operator might not want his/her own operation of the automobile monitored and/or recorded. This operation provides a default mode to lessen, or remove altogether, supervisory interaction until data is desired to be output. A more particular embodiment of this operation provides an ongoing warning to the supervised driver to remind the supervised driver that he/she is being "watched." Consistent therewith, one example method for operating an automobile recording mode includes recognizing either a supervisor-automobile-operation status or a non supervisor-automobile-operation status. In response to recognizing a supervisor-automobile-operation status, the recording mode is automatically disabled as a default operation. In response to recognizing a non supervisor-automobile-operation status, the recording mode is automatically enabled as a default operation, and automobile-operation data is then obtained in real time as the automobile is moving. The automobile-operation data is processed and a determination is made as to whether automobile operation is acceptable or unacceptable.

According to another example embodiment, the use of a vehicle is monitored by recording one or more vehicle operation signals, such as an electronic speed sensor signal and an automobile-direction parameter output. Such a record of vehicle-operation data contains periodic recordings of the speed and direction of a vehicle while the vehicle is being driven. A processor performs calculations using speed and directional data to calculate acceleration and rate of directional change. Vehicle-operation data from the recording device and the results of calculations performed on this data are compared to stored reference data to determine if the vehicle was abused or driven in an unsafe manner by the operator. The results are output to a display showing vehicle-operating data and instances where the vehicle was abused or driven in an unsafe manner. Such instances and/or abuses can be determined by comparisons with the stored reference parameters.

The above summary of the present invention is not intended to describe each illustrated embodiment or every implementation of the present invention. Other aspects of the invention are directed to image-capturing in and around the vehicle, disabling the ability to analyze and/or monitor operation of the vehicle (partially or completely), and determining when and whether operation of the vehicle is within or outside certain tolerances. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable for a variety of different types of vehicles, and the invention is particularly suited for monitoring motorized vehicles designed for use on streets and highways. While the present invention is not necessarily so limited, aspects of the invention may be appreciated through a discussion of various examples using this context.

In an example embodiment of the present invention, a computerized recording instrument is placed onboard a vehicle. This instrument periodically records data generated using an electronic speed sensor signal and, optionally, an output signal from electronic compass. The speed sensor signal and the output from the electronic compass are recorded at intervals frequent enough to perform calculations for acceleration and rate of vehicle directional change. The recorded data is time stamped and transferred by a CPU to a memory. The CPU later retrieves the recorded data and performs calculations of the vehicle acceleration and vehicle rate of directional change. Analysis of speed, direction, acceleration, and rate of directional change present a number of differing methods for determining if a driver is driving dangerously or abusing the vehicle. These values themselves or ancillary functions of these values, are compared to one or more reference value parameters stored internally in the system. For example, in one embodiment, a maximum vehicle speed is used as a stored reference value. This value can be programmed into the vehicle recording device by the person responsible for supervision of the vehicle. Whenever the vehicle exceeds this value, for example, seventy-five miles per hour, the defined parameter is exceeded, and an alarm will be shown to the vehicle supervisor (hereinafter "VS") on a display when accessing and/or processes the data from the system for review.

Review of this data can occur in a number of ways. For instance, the data can be reviewed live by: the driver as the defined parameter is being exceeded, and/or by a remotely-located VS via a wireless communication link (e.g., automated cellular telephone call to the VS in response to the alarm).

The data can also be processed by a processor internal to the vehicle monitoring arrangement and recorded internally to the vehicle monitoring arrangement for subsequent access directly from the vehicle monitoring arrangement and display without further correlation processing. For example, the processor internal to the vehicle monitoring arrangement can record the processed data on various media (e.g., removable plug-in RAM-card, magnetic tape, a magnetic disc, or a CD). In one embodiment, a writeable CD provides a convenient, easy-to-use recording and removable access to the recorded data. After such recording within the vehicle monitoring arrangement, the CD is then withdrawn for playback on a conventional computer or DVD player.

Another approach involves processing the data by a processor internal to the vehicle monitoring arrangement with the processing being handled only to a limited degree. The processed data is then recorded internal to the vehicle monitoring arrangement for subsequent access directly from the vehicle monitoring arrangement and for subsequent processing by another computer, for example, within a home or office environment. Such processing effectively transfers the task of correlating the vehicle operating parameters from the processor internal to the vehicle monitoring arrangement to the other computer, which can be advantageous where more sophisticated processing and/or display is desired. This application also lends itself well to the above-mentioned various media, including a writeable CD.

According to yet another aspect of the present invention, the data is processing to a limited degree by a processor internal to the vehicle monitoring arrangement, as described immediately above, but with the other computer performing the subsequent processing for the VS after the recorded data is sent to a central site, for example, by sending data indicative of recorded alarm conditions or the actual partially processed data itself to a central site for the correlation of the speed data, the time of occurrence and any other vehicle operation data. The central site can be implemented, for example, using an Internet web site, with an associated computer responding to the Web-fed information by providing display data in default formats or (paid-) subscriber selected formats. Such an arrangement is depicted on the right side of FIG. 1 using a modem 101 to send recorded vehicle-operation data to a target server 103 over the Internet 105. Whether from such a target server 103 or directly from the vehicle monitoring arrangement of FIG. 1, the data ultimately generated for display can be in any one of a number of formats, including a printout of simple text to one or more of the graphical formats shown and discussed in connection with FIGS. 3 and 4.

According to other embodiments of the present invention, functions more complex than vehicle speed are also monitored. For instance, in one application a vehicle-turning profile is used as a reference parameter. The turning profile is based on the speed of the vehicle time-aligned with the rate of directional change. This turn profile reflects that a rate of directional change that is safe at a low speed will be made more dangerous as the vehicle's speed increases. The curve defining a safe turning profile therefore provides that at a relatively high speed the driver take only relatively gradual turns.

Figure 1:
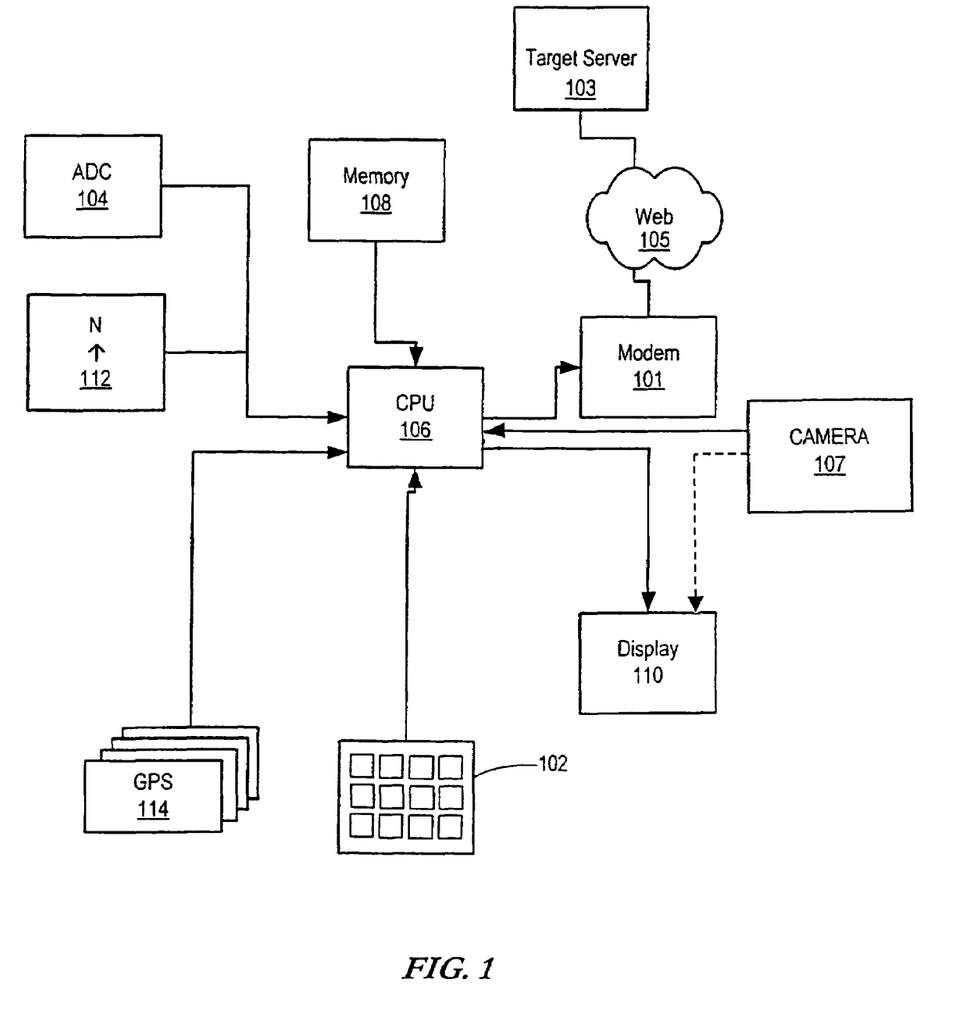
FIG. 1 shows a diagram of a monitoring arrangement for vehicle-operating data according to an example embodiment of the present invention.

In more specific embodiments, reference parameters may be used to control activation of an image sensor such as camera 107 of FIG. 1. Camera 107, which may be a still or video camera (or a combination thereof), captures images in the front and peripheral view of the driver (and optionally also images of the dashboard and speedometer). The camera 107 is activated as a function of the speed and/or direction data collected while monitoring the operation of automobile. In one such embodiment, the camera regularly captures and stores images external to the automobile so long as the automobile's speed and/or direction data (collected while monitoring the operation of automobile) does (not) exceed the reference parameters. A first type of driver and/or automobile owner may be concerned that rendering such recorded data to automobile authorities such as insurance companies, traffic police and others (e.g., involved in civil and/or criminal court), would be disadvantageous. A second type of driver and/or automobile owner may believe that rendering such recorded data to automobile authorities such as insurance companies, traffic police and others (e.g., involved in civil and/or criminal court), would be advantageous in showing innocence in connection with unexpected traffic incidents (accidents, traffic violations and/or other misuse). For this type, the images captured shortly before, during and shortly after (e.g., 3-5 seconds on each side of the incident), with variance depending on user preference, the camera type and frequency of image capture.

Other types of drivers and/or automobile owners may desire other operational modes or want the option to switch between various ones of these modes including, for example: (1) having the (image, speed and/or direction) data collected and stored for display only for driving episodes when data collected during the operation of the automobile indicates that the reference parameters were not exceeded; (2) having the (image, speed and/or direction) data collected and stored for display only for driving episodes when data collected during the operation of the automobile indicates that the reference parameters were exceeded; (3) having the camera activated and the (image, speed and/or direction) data collected and stored for display only for driving episodes when data collected during the operation of the automobile indicates that the reference parameters were exceeded; and (4) having the camera, and/or its ability to store image data, deactivated along with speed and/or direction only for driving episodes when data collected during the operation of the automobile indicates that the reference parameters were exceeded.

According to other implementations of the present invention, one or more of these modes can be a permanent operational mode, or a default mode and/or a mode selected and enabled at the factory or by the automobile owner. Where selected by the automobile owner or driver, various user-input selectors are available including: hard-line or software-based enable/disable or mode-select switches, (menu-driven) key entry with an application routine (e.g., implemented internal to the CPU 106 of FIG. 1 in response to user controls such as via the keypad 102), and features providing complete or partial power shut down. It will be appreciated that such CPUs can be implemented using one or more microprocessor or microcomputer circuits (e.g., a general purpose RISC circuit and a DSP (digital signal processing circuit) for processing/compressing functions relating to capture image/video data).

In one or more of the above embodiments where a driver and/or automobile owner may be concerned that rendering such recorded data to automobile authorities would be disadvantageous, disabling the data recording function can be achieved via a date-erasure function. The memory for such image data can be erased or overwritten in response to memory availability reaching its limit, user-programmed features (as discussed herein in connection with speed and direction data), one or more of the above modes, and/or a user-selectable recorded-data erase feature in which the CPU intentionally erases the data in response to an external event, or an operational threshold being exceeded or a control input selected by the user.

In another embodiment, an automobile owner enters into an arrangement with an insurance company whereby a certain term of the insurance agreement is satisfied so long as the insured can verify (and/or the insurance company can validate) that a certain one of these various modes was enabled.

In this context, reference parameters include one or more of: highway speed limits, automobile-turning speed limits where one or more different speeds are used as one or more respective thresholds for different turning geometries, and automobile-turning acceleration limits where one or more different acceleration rates are used as one or more respective thresholds for different turning geometries. It will be appreciated that, although acceleration limits are more typical than deceleration limits, deceleration limits may also be used or used in the alternative.

In another embodiment which is consistent many of the other embodiments discussed herein, the VS manipulates the displayable data using an interface, such as a key pad. Displayable data includes all of the recorded data, any ancillary calculated functions of the recorded data, any stored parameter defining data, and alarms from occasions when the stored parameters were exceeded. The display is structured to allow the VS to view all of the data or only selected characteristics. For example, the VS may simply wish to view the maximum speed attained by the vehicle during its previous use or the VS may similarly choose to view results of the more complex functions performed by the vehicle monitor. For example, any alarms showing the vehicle was turning outside of the safe region as defined by the stored reference turning profile.

FIG. 1 is a diagram showing an example embodiment of a vehicle monitoring arrangement according to the present invention. A new-event trigger is input from the user interface 102 instructing the unit to begin recording data. The vehicle's speed signal 104 is translated by an ADC (analog digital converter) and along with the output from the electronic compass 112 on the vehicle is used to generate vehicle-operation data for interpretation by the CPU 106. The CPU 106 of the vehicle monitor periodically records these outputs, which are time-aligned using a real-time clock circuit internal to the CPU 106. The CPU 106 transfers the recorded data to a memory 108. The recorded data is stored in the memory 108 until the CPU 106 accesses it for processing based on a VS request. The CPU 106 processes the data output from the ADC and the electronic compass to determine acceleration and rate of directional change. The recorded data and ancillary calculations are compared to stored reference parameters. An alarm is generated when the reference parameters have been exceeded. After analysis, the processing unit, in response to input from the user interface, moves the displayable data to a user display 110 where the VS can interactively view the results. For further details and alternative manners in which to process and provide detectable outputs (i.e., display) as a function of the vehicle's speed signal (e.g., signal 104), reference may be made to U.S. Pat. No. 5,982,168 (Westberg et al.), entitled "High Performance Tachometer With Automatic Triggering," incorporated herein in its entirety.

With alternative or additional vehicle-operation data generation devices onboard a vehicle, the uses of the vehicle monitor are expanded. In FIG. 1, the data recorded from the speed signal 104 on the vehicle is combined with knowledge or location of the vehicle. Global positioning satellite device (GPS) 114 monitors the location of the vehicle during operation. This includes providing data useful in identifying the roads over which the vehicle is traveling. The GPS 114 routes the location information to the CPU 106. This type of data can be recorded and reviewed simply to provide a parent/employer/legal-authority with evidence as to where the vehicle was driven. When used with the speed signal, the GPS (e.g., combined with a road-map navigator) 114 can also provide the speed limit on the road being traveled to the CPU 106. Position knowledge combined with knowledge of the posted speed limits on a specific road permits the CPU 106 to calculate if a driver is exceeding the posted speed limit. The legal speed limit or some selected value above this limit thereby operates as a maximum operation parameter. Instances when this parameter are exceeded are recognized during processing of the vehicle-operation data and are recorded as an alarm, and the alarm data is instantly and/or subsequently displayed.

Figure 2:
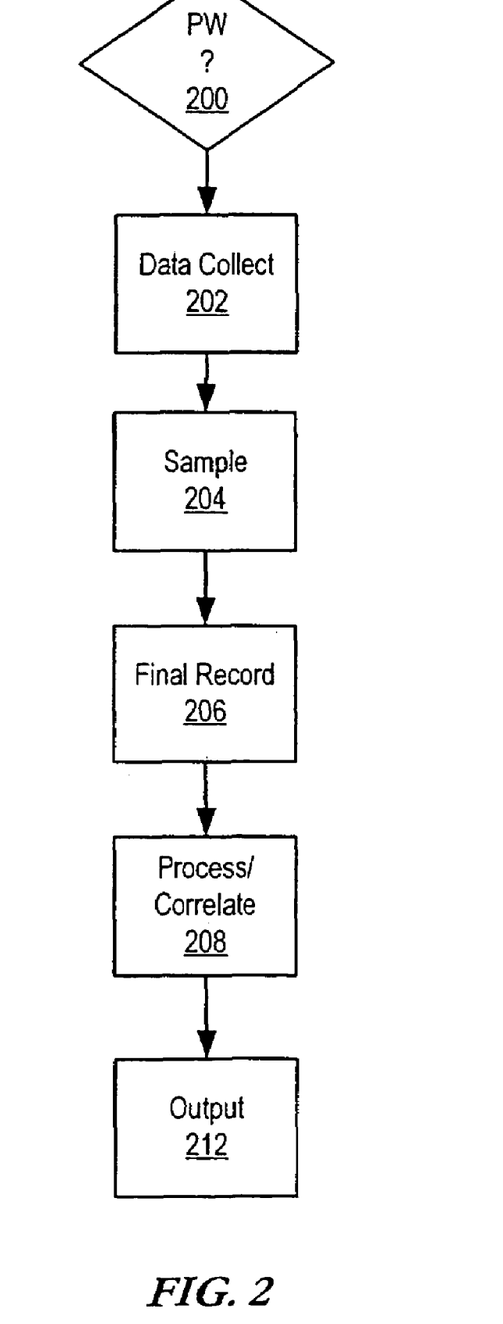
FIG. 2 is a flow diagram of an example approach for vehicle monitoring in accordance with the present invention.

In one example embodiment, different configurations of the vehicle monitor permit different options for the interaction between the CPU (or other processor arrangement) and the memory depending on the need for and amount of memory available. FIG. 2 illustrates an example approach for one such vehicle monitoring operation. Block 200 depicts a VS entering a password (via keypad 102) the verification of which permits the VS to select an option of how to handle the data sampling and recording operation. Depending on which option is selected, the data will be recorded with different types of data-loss risks since longer vehicle-monitoring sessions with frequent data sampling and display-intentional recording will require much larger blocks of memory. For these types of monitoring sessions, the VS initiating the recording can initiate a recording option that fits the anticipated driving situation. As examples: if the VS anticipates a relatively short drive and/or few "alarm" conditions needing to be recorded, the vehicle monitoring arrangement can be programmed (e.g., via keypad 102) to record all alarms and to sample data relatively frequently (e.g., every quarter second); if the VS anticipates a relatively long drive, the vehicle monitoring arrangement can be programmed to record all alarms while discarding data associated with the less severe alarms at a rate corresponding to the need for additional memory, and to sample data relatively infrequently (e.g., each second). Once all the available memory is used, the processor can be programmed to either stop recording data, write over the oldest data with the more recently-obtained data, or replace the data on the basis of the severity of the alarms (e.g., an alarm generated as a result of exceeding the speed by five percent is replaced by an alarm generated as a result of exceeding the speed by ten percent).

It will be appreciated that a relatively short or long drive is defined as a function of the total volume of data being recorded during the driving period and the initially-available volume of memory; the total volume of data being recorded during the driving period, is of course, a function of the time duration, the recording frequency, (whether alarm data and/or ongoing data being collected) and the amount of data recorded in each instance.

From block 200 of FIG. 2, flow proceeds to block 202 which depicts an initial ("turn-on") event trigger signal (such as ignition, a vehicle turn, or an initial minimum speed) being presented to the CPU to begin the real-time data collection process. In response, the CPU begins to periodically sample and temporarily record the vehicle operation data in a cache, or local buffer, as indicated at block 204. In addition to data generated from the speed signal, the vehicle can also be equipped to record vehicle direction data as can be provided from a conventional electronic compass.

The electronic compass is used in this application to track vehicle direction and the speed at which turns are occurring in certain periods of time. For example, in a particular example application, the vehicle monitor is configured to record speed data each five seconds after the initial event trigger signal and to record vehicle-turn data around events in which the vehicle turns with an initial turn speed of at least ten miles per hour. Once the vehicle monitor is activated by the initial event trigger signal, anytime the vehicle turns with an initial turn speed of at least ten miles per hour, the data previously sampled and temporarily recorded for a given period of time before and after this event (e.g., two seconds before and ten seconds after) is time-stamped and transferred to a more permanent location for subsequent processing (block 206) from which correlated presentation data is generated and recorded for supervisory access and display.

Figure 3:
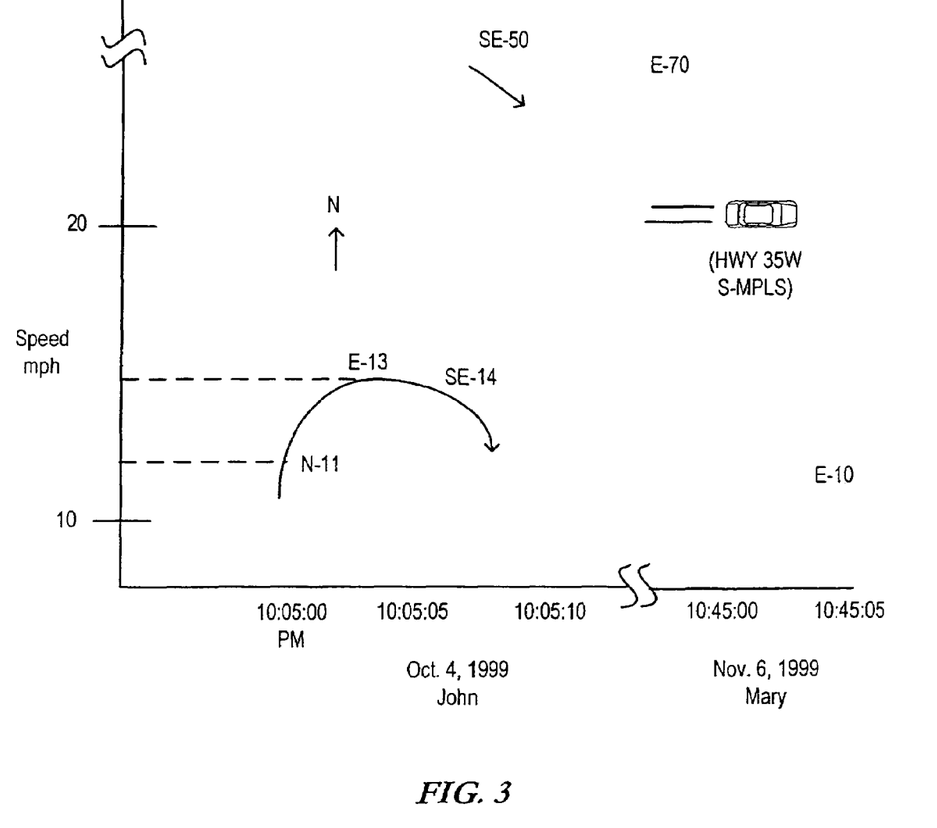
FIGS. 3 and 4 are display formats shown various manners in which to display information as a function of certain data including the data recorded during vehicle operation, according to other specific example aspects of the present invention.
Figure 4:
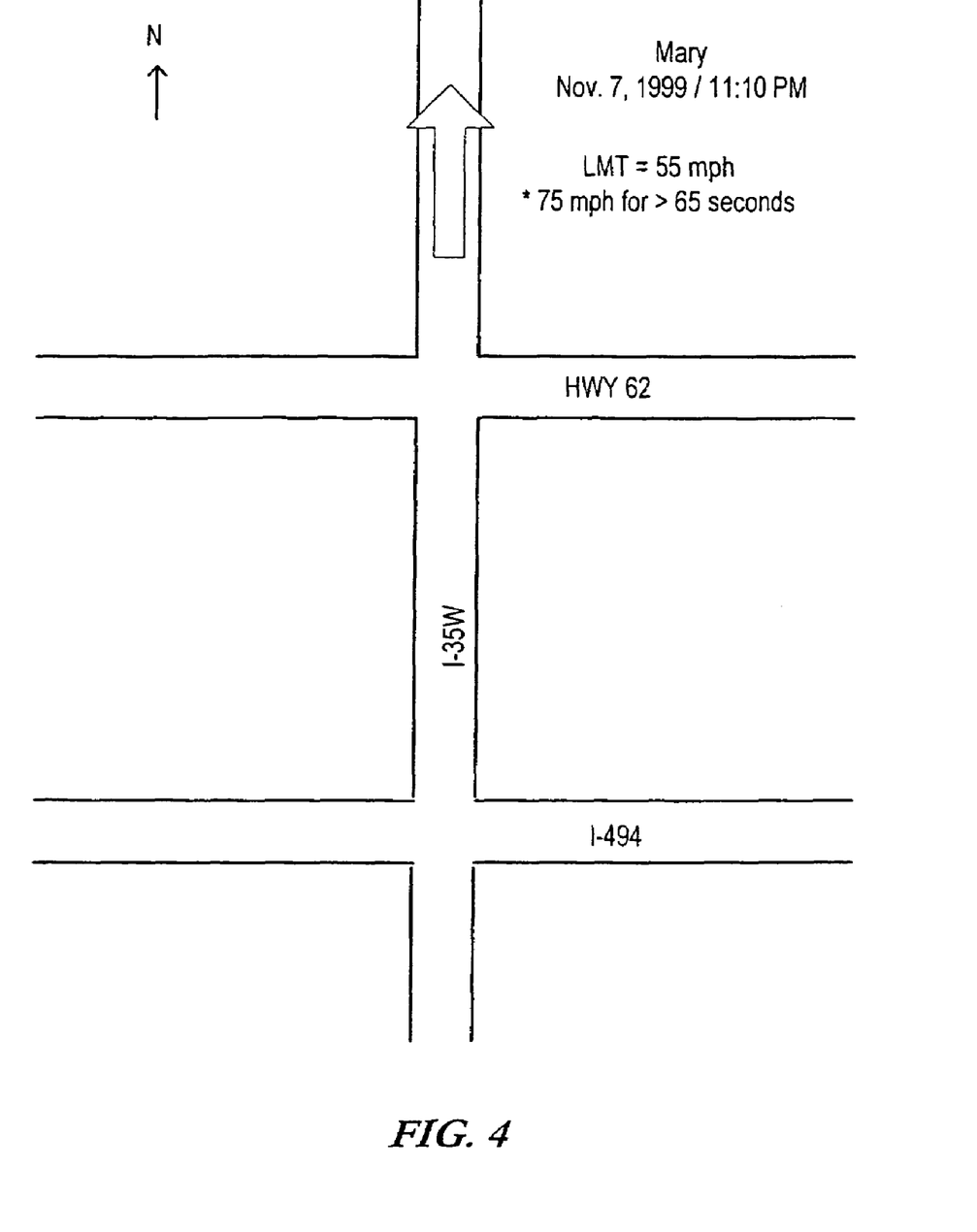

FIG. 3 provides an example presentation format for display of the data recorded for the event characterized above. In this vehicle situation, the vehicle monitor detected that the vehicle was traveling North when it began a turn at eleven miles per hour at exactly 10:05 pm. Two seconds later, the vehicle was traveling East at thirteen miles per hour; and, five seconds after 10:05 pm, the vehicle was traveling Southeast at fourteen miles per hour. Ten seconds after it began this recorded turn, at 10:05:10 pm, the vehicle was traveling Southeast at fifty miles per hour. The curved arrow in FIG. 3 depicts an added graphical view showing the patterned direction of the recorded vehicle turn. Further along the horizontal time line in FIG. 3, the graph depicts the vehicle (weeks later) quickly decelerating from seventy miles per hour when traveling East at exactly 10:45:00 pm to ten miles per hour still headed East at exactly 10:45:50 pm. For more sophisticated embodiments of the present invention including a GPS and street-mapping navigation programming, this time-stamped deceleration event can be correlated to the GPS-defined location of the vehicle as indicated by the parenthetical abbreviation "HWY 35W S-MPLS" which indicates that at this event time the vehicle was traveling just South of Minneapolis on Highway 35W. FIG. 4 illustrates another user-friendly display format.

The degree and/or detail of graphical-data presentation is not critical for most applications, and the subsequent processing of the data recorded at block 206 of FIG. 2 for subsequent display processing can be altered to suit any given application. Associated with block 208 of FIG. 2, FIG. 3 depicts the CPU performing the actual processing of the data recorded at block 206 for subsequent user display. For a typical parent-teen application involving different teen drivers with relatively infrequent review of the data, the minimal graphical-data presentation features include: driver name, date, time, exceeded thresholds (e.g., including speed limits obtained via the GPS map-navigational systems), and direction of travel. Such data is included in each of the formats shown in FIGS. 3 and 4.

As mentioned previously, this processing can be performed at different times depending on the application: as an ongoing background task for the CPU with the display-formatted results being returned to the memory unit while additional vehicle operation data is being received and collected; by the same CPU after and/or during the vehicle monitoring session; and/or by another CPU after and/or during the vehicle monitoring session.

The processing can include additional calculations and generate other data useful in determining how the vehicle was used. For instance, the speed and time data can be used to calculate acceleration and deceleration rates, and the direction and time data can be used to calculate the rate and severity of directional change. In combination with this processing, in a manner similar to the alarm thresholds discussed above for the maximum speed, the CPU can be alerted by using other acceptable threshold parameters for each of the generated and calculated vehicle-operation data variables. In this regard, the vehicle monitor alerts the driver and/or vehicle VS of instances in which these acceptable threshold parameters are being exceeded.

In another example embodiment, a reference parameter provides a turning profile that matches vehicle acceleration with rate of directional change. The maximum acceptable rate of directional change is tied to the acceleration of the vehicle. Therefore, a sharp turn made while ac/decelerating in order to perform a "donut" maneuver will be outside the acceptable parameters stored in the vehicle monitor.

In another embodiment, vehicle acceleration and deceleration threshold levels are programmed into the vehicle monitoring arrangement as reference parameters. Acceptable acceleration and deceleration threshold levels are useful when a general default setting is used but are more valuable when they are vehicle specific based upon the capabilities of the vehicle. Therefore default settings are provided, but the VS can override the default setting and input acceleration or deceleration parameters specific to the vehicle. In the same manner, other reference parameters can be defined and input by the VS for the other vehicle-operation data processed by the vehicle monitor.

In one alternative embodiment, only alarm data and alarm context data are stored. The context data is the data defining the vehicle operation leading up to and following the actual alarm-generating occurrence. The CPU processes the data as it is sampled looking for instances in which the reference parameters have been exceeded. When the CPU determines a reference data parameter has been exceeded, the alarm and the context data surrounding the alarm generation are recorded. The CPU contains a limited memory that allows the context data generated before an alarm, to be saved to the memory after an alarm, is generated. When the memory is full with alarm data and context data, the overflow data is stored based on a prioritization system that favors alarm data. The CPU begins recording over context data preserving only alarm data. The context data is selectively overwritten by extending the intervals between data points for the recorded context data. For example, instead of having context data with a data point taken every second, four out of five data points will be overwritten leaving only every fifth data point. Context data is selectively overwritten in this way until only alarm data remains. When all the context data has been recorded over, leaving only alarm data, new alarms are not recorded. The saved data is displayed upon request by the VS.

In another embodiment, once the memory is filled, the overflow data is stored based on a prioritization system that favors alarms and context data. General operation data that does not fall outside of acceptable parameters and is not context data to an alarm is overwritten first. If more memory is still needed, context data is selectively overwritten by leaving only interval context data. For example, instead of having context data with a data point taken every second, four out of five data points will be overwritten leaving only every fifth data point. Context data is selectively overwritten in this way until only alarm data remains. When all the context data has been recorded over, leaving only alarm data, new alarms are not recorded.

It will be appreciated that each of the above-described options can be implemented as being selectable in the same vehicle monitoring arrangement, a single one of these options can be implemented or two or more combinations of these options can be implemented.

In yet another example embodiment, the role of the onboard CPU is limited to simply time-aligning and routing the generated "raw" data for storage in the memory. The data is stored in the memory until it is downloaded to a location separate from the vehicle for processing and display.

In another example embodiment of the present invention, additional vehicle characteristics are monitored. FIG. 1 shows that signals from additional signal source generators can be received, monitored and processed in the above-described manner; these include: engine revolutions per minute (e.g., also using the speed signal), vehicle roll or pitch (using the same sensor types vehicles currently use to deploy front and side air bags), the number of occupants in the vehicle at any given time (e.g., using an arrangement such as shown in U.S. Pat. No. 6,014,602), shock absorber and suspension system use characteristics ((e.g., using one or more electro-magnetic anti-gravitational detectors mounted near each shock absorber or co-located with the vehicle monitoring arrangement). Also, microphones can be placed within the vehicle and/or monitoring device along with transducers to indicate sound levels and/or types (e.g., from people, car-phone sounds, braking, engine roar and/or music) occurring at certain (alarm) times, and whenever sound-level thresholds have been exceeded. Monitoring these additional outputs generates a more fully developed profile of the manner in which the vehicle is operated, as is useful for vehicle maintenance purposes and vehicle safety data. Default settings are provided for each of the additional data sources monitored or the VS may input their own particularized settings.

In another example embodiment of the present invention, the input by the VS can customize features for the monitoring of a subsequent trip. Using a graphic or keypad interface, the VS can specify the driver of the vehicle. The VS can also specify the length of time for which the vehicle should be monitored for the subsequent trip. In addition, the VS can set the parameters of the vehicle monitor to personalized settings for the monitored vehicle-operation data, and also specify which vehicle-operating data to monitor.

In another example embodiment of the present invention, the driver of the vehicle is required to input a breathalyzer sample to determine if they have been drinking alcohol. The results of the breathalyzer are recorded and output as displayable data. The vehicle monitor requires a breathalyzer each time the vehicle is started. Additionally, the vehicle monitor allows for multiple breathalyzer tests to be performed during the same trip. Time between required breathalyzer tests is programmable by the VS. For example, the vehicle monitor may be programmed by a court of law to require that the driver submit to a breathalyzer every thirty minutes while they are driving to insure that they do not start the car while intoxicated and also that they do not drink while the car is running.

Related to the problem addressed above in insuring a driver is sober when they operate the vehicle is another example embodiment. Here, the vehicle monitor is connected to the vehicle ignition and will only unlock the ignition after the correct input has been given to the vehicle monitor. In the breathalyzer example above, the correct input would be the breathalyzer results showing no alcohol present. In another example, the correct input is a driver identification or a password.

In another example embodiment of the present invention, access to the data contents and output of the vehicle monitor are limited. The stored data is only accessible to authorized personnel and is only accessible to those with the correct input (password) for the VS interface. In addition to limiting access, the data is also protected from modification or deletion so that the vehicle can indeed be effectively monitored.

In another example embodiment of the present invention, the user interface can be accessed remotely. A modem is used to establish contact between the vehicle monitor on board the vehicle and the remote VS. In this way, the VS can input any information that would otherwise be done at the vehicle including inputting event triggers or redefining operation parameters. Additionally, the VS can interactively receive a remote output that shows displayable data from the vehicle monitor.

In another example embodiment and application of the present invention, the vehicle monitoring arrangement is installed in police cars and the data (alarm and/or all other data) recorded during certain intervals is used in connection with evidentiary questions for example after a car chase or other dangerous incident.

Various embodiments of the present invention are applicable to a wide variety of applications. In addition to parent-child vehicle supervision, the invention advantageously serves: vehicle use as may arise in criminal probation; employer-employee vehicle monitoring; car rental agencies and owners generally interested in using such data to substantiate proper use of a vehicle when attempting to sell that vehicle or when attempting to maintain discounted rates with insurance companies (this entails extensive recording and/or data archiving over extended periods of time); and as general indicators that various portions of the vehicle should be serviced.

Moreover, although not required, the present invention can be advantageously implemented using readily available vehicle-generating signals (such as the vehicle speed signal, an electronic compass, and/or an auto-equipped GPS unit), and using currently-available technology. For instance, numerous commercially-available processor arrangements can be used for such processing, including the CPUs installed in laptops and desktop PCs. The vehicle recording arrangements described in connection with the present invention can be readily enclosed in a black box, with or without a display, and with or without an opening for inserting and removing the display-purposed recording media (e.g., a CD, RAM board or 8 mm tape). Alternatively, a vehicle already including these hardware components (e.g., writeable CD recorder/player, electronic compass, speed signal, CPU based control system) in readily configurable to provide the above discussed operation, for example, using writeable CD to record the alarm and/or selected-interval data for display directly from the recorded CD. As another alternative, some or all of the above-mentioned components already equipped as part of the vehicle, assuming less than all of a desired set of signal sources, are used in combination with certain of the operative intelligence installed separately (for example, the CPU, recording media and input signal interfaces); in this manner, a cost effective product is provided without redundant use of hardware already present in the vehicle.

Some of the above embodiments can be appreciated when considering an example automobile having been equipped with a writeable CD recorder/player, and a CPU-based control system communicatively coupled to an electronic compass, a speed signal, and driver-position sensor (e.g., a sensor/memory control for a powered driver-seat and/or adjustable driver pedals). According to certain embodiments of the present invention, for certain vehicles including such a driver-position sensor, the CPU-based control system uses the driver-position sensor to match a data recording file to a certain driver for driver identification purposes from the vantage point of the VS.

According to one application, the present invention is implemented for a parent-teen monitoring relationship as follows. First, the VS enters a manufacturer-programmed "VS access code" via user interface (e.g., keypad 102 of FIG. 1) to configure the CPU-based control system (106 of FIG. 1) with various data including one or more of the following: new personalized VS password; the names of drivers for which electronic files are established for data recording; selecting activation of one or more of the available types of thresholds and the threshold levels (e.g., mph over GPS-available speed limits; speed limits for vehicle turns; acceleration and deceleration rate limits, hours for which driving is prohibited; whether to activate remote communication via the modem-web path or via a wireless (e.g., cellular) call for remote reconfiguration of the CPU-based control system, and live monitoring from a remote site for a status check on device operation and/or vehicle location (as in a theft application); using GPS-defined settings, any designated regions of prohibited travel and/or maximum distance settings; which activated thresholds, if any, should be communicated to certain drivers (e.g., via sound and/or display) in response to the programmed thresholds being exceeded; and how the recorded data should be processed. For any non-selected features, the CPU-based control system defaults to an initial setting, for example, for recording only maximum speeds and maximum rates of speed changes.

With the vehicle-monitoring operation fully configured, the data recording process begins for a particular driver. This process can be initiated in a number of ways including, for example, via remote activation via the modem-web path or a cellular call (e.g., from a VS such as the parent, an auto-insurance agent, an attorney representing the driver and vehicle owner for legal-monitoring purposes).

According to the programmed settings, after or during the recording session, the driver and/or VS can review the displayable data in any of the previously described manners. For instance, a week after use of the vehicle by one or more teen drivers, the VS can enter the password for accessing the data and then, using a menu-driven display, review for each driver each exceeded threshold. In the example illustration of FIG. 1, the keypad 102 can be used to provide such general user control and user access to provide such optional features as driver ID, desired recording and display formats, menu-driven viewing and threshold-setting designations.

Figure 5:
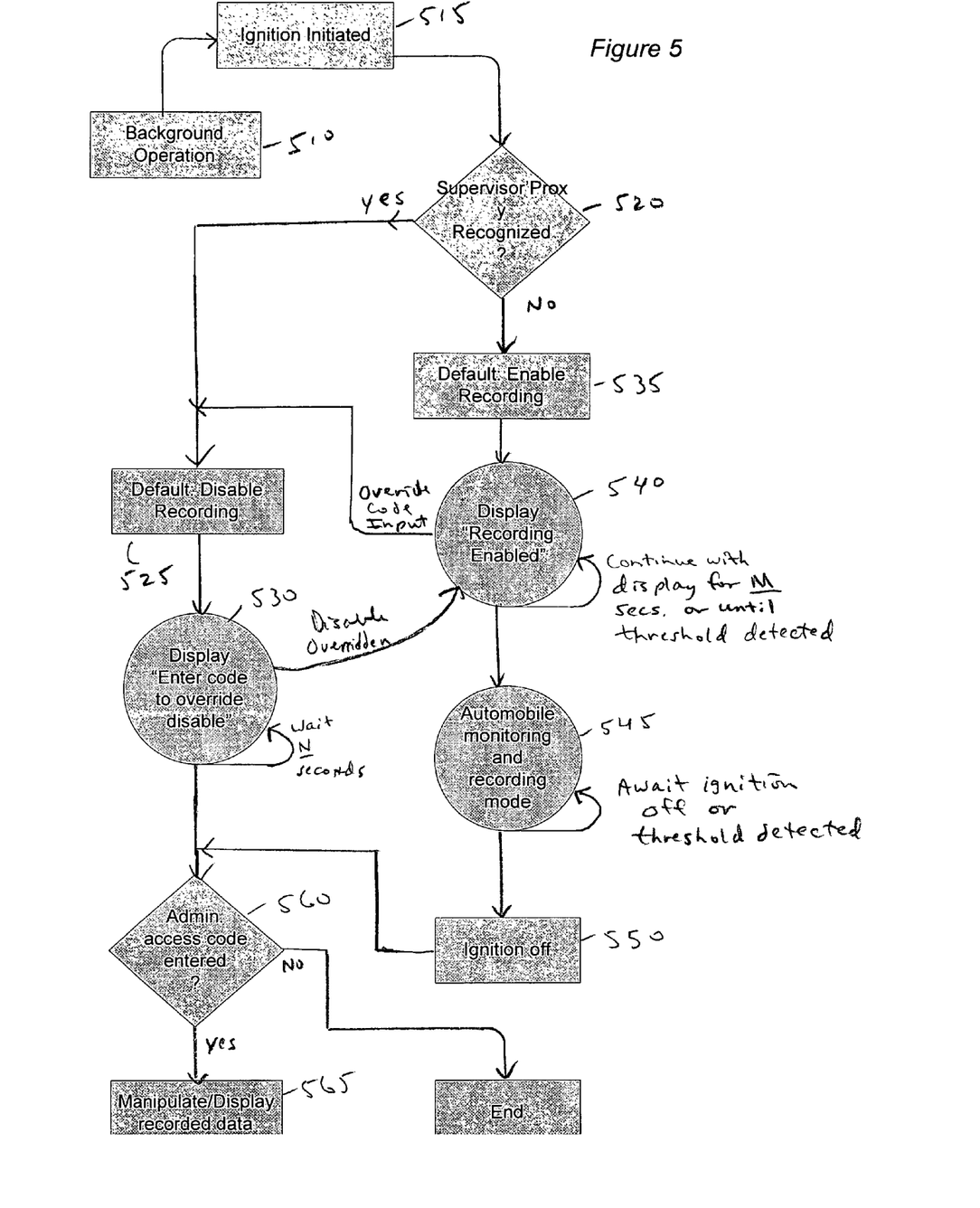
FIG. 5 is a flow diagram of another example approach for vehicle monitoring in accordance with the present invention.

FIG. 5 is a flow diagram showing an exemplary operation of the above-described VS according to yet another aspect of the present invention. Consistent with the above described equipment and general operations, the operation depicted in FIG. 5 addresses the need for a supervisory automobile operator (or automobile owner) to monitor another driver of the automobile while recognizing that the supervisory automobile operator might not want his/her own operation of the automobile monitored and/or recorded. This operation provides a default mode to lessen, or remove altogether, supervisory interaction until data is desired to be output. A more particular embodiment of this operation shown in FIG. 5 provides an ongoing warning to the supervised driver to remind the supervised driver that he/she is being "watched."

Assuming that power is provided to the monitoring system at all relevant times, the operation of FIG. 5 transitions from a background operation at block 510 to block 515 where an ignition "on" state is recognized. With the automobile started, from block 515, flow proceeds to decision block 520 where a detection mechanism (not shown) attempts to recognize whether the driver of the automobile is the supervisor (or a proxy for the supervisor). This recognition can be achieved in various ways including various previously-available approaches. These approaches include, for example, use of: a coded "supervisor" key for starting the ignition; a "supervisor" code used at a keypad for opening the car door or otherwise enabling an aspect for starting the automobile; and a biological recognition device such as a voice, fingerprint or retina detector. Depending on the approach used, various detailed implementations contemplate using the portion of the operation shown in block 520 as preceding the portion of the operation shown in block 515.

If the detection mechanism recognizes that the driver of the automobile is the supervisor (or a proxy), flow proceeds to a default operation in which the operation of the automobile is not monitored/recorded. This disable-default operation is depicted at block 525. In this disable-default operation, from block 525, flow proceeds to block 530 where the CPU (or other operational logic) provides a prompt display ("Enter code to override disable") as an option for the driver to override this disable-default operation and send the operation to an enable-default operation as depicted at blocks 535, 540 and 545.

Accordingly, the enable-default operation begins in response to the detection mechanism recognizing that the driver of the automobile is the supervisor/proxy from block 520, or from block 530 in response to the CPU recognizing an override disable code to override the disable-default operation. At block 540, the CPU provides a visual display as an ongoing or temporary ("M" seconds) warning to the supervised driver to remind the supervised driver that he/she is being "watched." In certain variations (which may be selectable by the supervisor in a setup/configuration mode), this warning can also be implemented using a form other than a visual display including, for example, a vibration in the seat, or an audible alarm. In certain implementations, such warning is provided on an ongoing basis and/or when certain low-level thresholds are reached; such low-level thresholds might include exceeding certain speed limits by 1-3 miles per hour and/or turning the automobile at a rate that is at about the desired upper end of a range designated as being within a safe threshold.

Block 545 depicts the monitoring/recording operation (which can be concurrent with the operation at block 540). At block 550, the ignition is off. At this juncture or during another safe automobile status and in response to an administration code (or another supervisory-level code) being entered, the CPU permits the administrator (or supervisor) to access the data for display (output) purposes.

According to various implementations and applications, the above-described default operations could permit monitoring of automobile operation at all times with the default enable operation applying only to the recording aspect, or the default disable operation could be implemented to disable both the monitoring and the recording aspects of the operation(s) discussed in connection with FIG. 5.

While the present invention has been described with reference to several particular example embodiments, those skilled in the art will recognize that many changes may be made thereto without departing from the spirit and scope of the present invention. For example, various data compression and data accessing techniques can be combined to more effectively utilized memory and provide display aspects. The spirit and scope of the present invention is set forth in the following claims.

What is claimed is:

1. A method for operating an automobile recording mode for automobile operation, the method comprising:
recognizing either a supervisor-automobile-operation status or a non supervisor-automobile-operation status;
in response to recognizing a supervisor-automobile-operation status, automatically disabling the recording mode as a default operation;
in response to recognizing a non supervisor-automobile-operation status, automatically enabling the recording mode as a default operation;
providing automobile-operation data obtained in real time as the automobile is moving, wherein the automobile-operation data is accessible per different secure-access profiles in which,
one of the secure-access profiles permits access of a subset of the automobile-operation data; and
another of the secure-access profiles permits access of another set of the automobile-operation data, the other set including the subset; and
processing the automobile-operation data and determining whether automobile operation is acceptable or unacceptable.

2. The method of claim 1, wherein the other of the secure-access profiles permits changing default parameters.

3. The method of claim 1, wherein the other of the secure-access profiles permits reviewing and modifying the automobile-operation data.

4. The method of claim 1, wherein the other of the secure-access profiles permits erasing the automobile-operation data.

5. A method for recording and subsequent monitoring of an operation of an automobile, the method comprising:

recognizing either a supervisor-automobile-operation status or a non supervisor-automobile-operation status;

providing automobile-operation data, including at least one automobile-direction parameter, obtained in real time as the automobile is moving, wherein the automobile-operation data is accessible per different secure-access profiles in which,     one of the secure-access profiles permits access of a subset of the automobile operation data; and     another of the secure-access profiles permits access of another set of the automobile-operation data, the other set including the subset;

in response to recognizing a non supervisor-automobile-operation status, recording the automobile-operation data as a default operation; and processing the automobile-operation data and determining whether automobile operation is acceptable or unacceptable.

6. The method of claim 5, further comprising warning a driver of the automobile that the automobile is turning at a rate that is at or about the desired upper end of a range designated as being within a safe threshold.

7. The method of claim 5, further comprising warning a driver of the automobile that operation of the automobile is being monitored.

8. The method of claim 5, further comprising warning a driver of the automobile that operation of the automobile is close to an unacceptable threshold.

9. The method of claim 8, wherein the warning a driver of the automobile that operation of the automobile is close to an unacceptable threshold includes providing a visual signal.

10. The method of claim 8, wherein the warning a driver of the automobile that operation of the automobile is close to an unacceptable threshold includes providing an audible signal.

11. The method of claim 8, wherein the warning a driver of the automobile that operation of the automobile is close to an unacceptable threshold includes providing a vibration signal.

12. An arrangement for operating an automobile recording mode for automobile operation, comprising:

means for recognizing either a supervisor-automobile-operation status or a non supervisor-automobile-operation status;

means for in response to recognizing a supervisor-automobile-operation status, automatically disabling the recording mode as a default operation;

means for in response to recognizing a non supervisor-automobile-operation status, automatically enabling the recording mode as a default operation;

providing automobile-operation data obtained in real time as the automobile is moving, wherein the automobile-operation data is accessible per different secure-access profiles in which,     one of the secure-access profiles permits access of a subset of the automobile operation data; and     another of the secure-access profiles permits access of another set of the automobile-operation data, the other set including the subset; and means for processing the automobile-operation data and determining whether automobile operation is acceptable or unacceptable.

13. The arrangement of claim 12, further comprising:
means for warning a driver of the automobile that the automobile is turning at a rate that is about the desired upper end of a range designated as being within a safe threshold.

14. The arrangement of claim 12, further comprising:
means for warning a driver of the automobile that operation of the automobile is being monitored.

15. The arrangement of claim 12, further comprising:
means for warning a driver of the automobile that operation of the automobile is close to an unacceptable threshold.

16. The arrangement of claim 12, wherein the other of the secure-access profiles permits changing default parameters.

17. The arrangement of claim 12, wherein the other of the secure-access profiles permits reviewing and modifying the automobile-operation data.

18. The arrangement of claim 12, wherein the other of the secure-access profiles permits erasing the automobile-operation data.

* * * * *

UNITED STATES PATENT AND TRADEMARK OFFICE
CERTIFICATE OF CORRECTION

PATENT NO. : 7,584,033 B2  Page 1 of 1
APPLICATION NO. : 11/024044
DATED : September 1, 2009
INVENTOR(S) : Mittelsteadt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1186 days.

Signed and Sealed this

Fourteenth Day of September, 2010

David J. Kappos
*Director of the United States Patent and Trademark Office*